United States Patent
Suzuki et al.

(10) Patent No.: US 8,241,175 B2
(45) Date of Patent: Aug. 14, 2012

(54) HYBRID DRIVING APPARATUS AND VEHICLE PROVIDED WITH THE SAME

(75) Inventors: Yoshitaka Suzuki, Nishikamo-gun (JP); Keiichi Murata, Tahara (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 615 days.

(21) Appl. No.: 12/519,664

(22) PCT Filed: Dec. 27, 2007

(86) PCT No.: PCT/JP2007/075419
§ 371 (c)(1),
(2), (4) Date: Jun. 17, 2009

(87) PCT Pub. No.: WO2008/084753
PCT Pub. Date: Jul. 17, 2008

(65) Prior Publication Data
US 2010/0093486 A1    Apr. 15, 2010

(30) Foreign Application Priority Data
Jan. 10, 2007    (JP) ................................. 2007-002549

(51) Int. Cl.
*H02P 17/00* (2006.01)

(52) U.S. Cl. ............................................ 477/15; 477/3

(58) Field of Classification Search .................. 477/3, 7, 477/15; 903/902, 930
See application file for complete search history.

(56) References Cited

U.S. PATENT DOCUMENTS

| | | | |
|---|---|---|---|
| 6,332,450 B1 * | 12/2001 | Muto et al. ..................... | 123/352 |
| 7,010,400 B2 * | 3/2006 | Hisada et al. .................... | 701/22 |
| 7,736,265 B2 * | 6/2010 | Yamamoto et al. ............... | 477/3 |
| 7,813,865 B2 * | 10/2010 | Martin ........................... | 701/103 |
| 2005/0029023 A1 | 2/2005 | Takami et al. | |
| 2007/0083315 A1 * | 4/2007 | Takamatsu et al. ............. | 701/90 |

FOREIGN PATENT DOCUMENTS

| | | |
|---|---|---|
| JP | 2002-225578 A | 8/2002 |
| JP | 2004-204960 A | 7/2004 |
| JP | 2005-039923 A | 2/2005 |
| JP | 2006-062418 A | 3/2006 |
| JP | 2006-315485 A | 11/2006 |

* cited by examiner

*Primary Examiner* — Justin Holmes
(74) *Attorney, Agent, or Firm* — Sughrue Mion, PLLC

(57) ABSTRACT

Switching conditions are defined by a threshold $\alpha 1$ for switching from "power OFF control" to "power ON control", and a threshold $\alpha 2$ for switching from the "power ON control" to the "power OFF control". During a period of a shift operation, the thresholds are changed toward thresholds $\beta 1$ and $\beta 2$ smaller than $\alpha 1$ and $\alpha 2$ depending on a shift progress degree PRG, respectively.

9 Claims, 10 Drawing Sheets

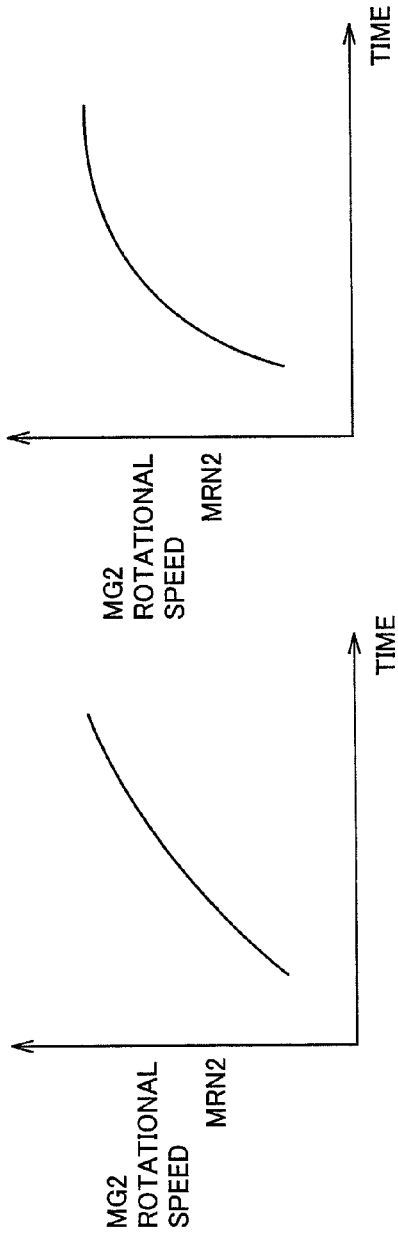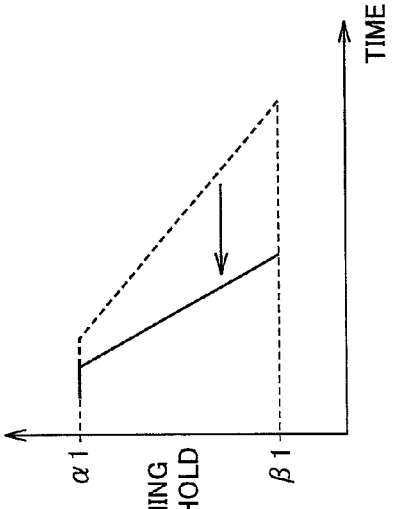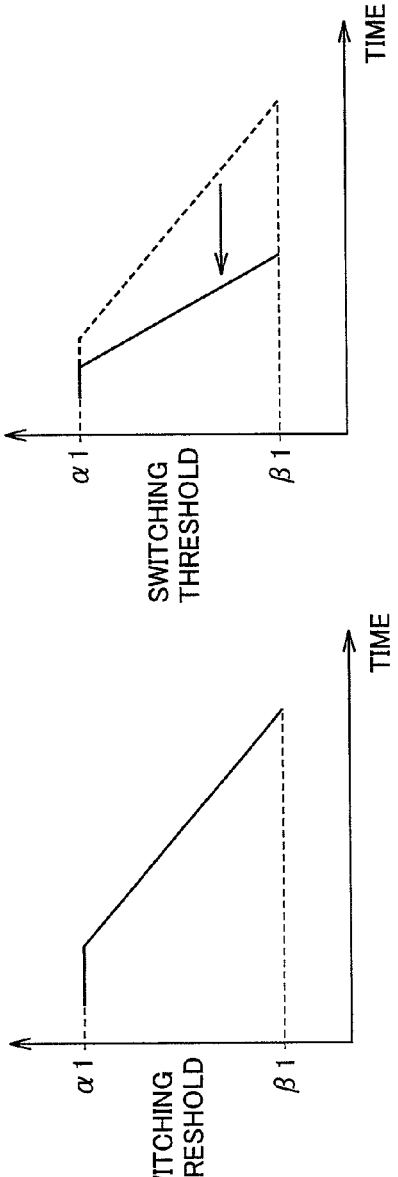

HYBRID DRIVING APPARATUS AND VEHICLE PROVIDED WITH THE SAME

TECHNICAL FIELD

The invention relates to a hybrid driving apparatus provided with a plurality of power sources as well as a vehicle provided with the hybrid driving apparatus, and particularly to a structure in which a specific power source is connected to a rotation output shaft via a transmission mechanism.

BACKGROUND ART

Japanese Patent Laying-Open No. 2002-225578 has disclosed a hybrid driving apparatus in which at least a part of paths transmitting powers from a plurality of power sources to wheels are formed of a common path, and a power state control device that changes a state of power transmission between two rotation members is arranged in a path transmitting a power provided from a predetermined power source among the plurality of power sources to the wheels.

According to this hybrid driving apparatus, even when the state of the power transmission between the two rotation members is to be changed for transmitting the power from the predetermined power source to the wheels, the power of the power source other than the predetermined power source is transmitted to the wheels, which avoids lowering of the torque transmitted to the wheels.

When a transmission mechanism that can selectively set a plurality of gear ratios is employed as the above power state control device, the torque provided from the predetermined power source can be increased or decreased for transmitting it to the wheels. FIG. 6 in Japanese Patent Laying-Open No. 2002-225578 has disclosed a structure in which a gear ratio can be switched between two gears, i.e., a low gear (LOW) and a high gear (HIGH) according to a vehicle speed.

In the hybrid driving apparatus described above, when a shift operation is to be performed from the high gear to the low gear, an engaging operation is performed in such a state that the rotational speed of the power source connected to the transmission mechanism in interest has been substantially raised to a rotational speed corresponding to the low gear, and thus, a so-called "clutch-to-clutch" is executed, Therefore, in the shift operation from the high gear to the low gear, i.e., when the currently selected gear ratio is to be raised to the larger gear ratio, it is necessary to increase the output from the power source and thereby to raise the rotational speed. This output control of the power source is executed by the shift control system governing the shift operation.

When a drive operation, e.g., on an accelerator pedal is performed to request a larger vehicle drive power, it is necessary to increase the output of the power source in interest. Usually, the output control of the power source according to this drive operation is executed by a run control system that governs vehicle running and is arranged independent of the shift control system.

As described above, the two control systems can operate independently of each other in the operation of shifting from the high gear to the low gear, and therefore it has been required to find out an optimum switching manner for these control systems. More specifically, when the run control system is selected on a priority basis, such a problem occurs that the rotational speed of the power source cannot be raised rapidly, and the shift operation delays. Conversely, when the shift control system is selected on a priority basis, this causes a problem of lowering a response of a vehicle behavior to a drive operation. Further, such a problem occurs that the output torque of the power source may change rapidly to apply a shock to a driver and/or passenger(s) depending on the timing of switching between the shift control system and the run control system.

DISCLOSURE OF THE INVENTION

The invention has been made of overcoming the above problems, and an object of the invention is to provide a hybrid driving apparatus that can control a drive power source by appropriately switching a torque request value between the torque request value corresponding to a drive operation and the torque request value corresponding to changes in rotational speed during a shift operation for shifting from a currently selected gear ratio to a gear ratio larger than the currently selected gear ratio, as well as a vehicle provided with the hybrid driving apparatus.

A hybrid driving apparatus according to an aspect of the invention includes a rotation output shaft for receiving a whole or a part of output from a first power source; a transmission mechanism for selectively providing a plurality of gear ratios by a combination of engaging and releasing of a plurality of frictional engagement devices; a second power source connected to the rotation output shaft via the transmission mechanism; a first producing unit for producing a first torque request value for the second power source according to a drive operation; a second producing unit for producing a second torque request value for the second power source according to changes in rotational speed caused by a shift operation; a switching unit for selecting one of the first and second torque request values according to switching conditions based on the first torque request value during a period of a shift operation from a first gear ratio to a second gear ratio larger than the first gear ratio; a control unit for controlling the second power source according to the torque request value selected by the switching unit; and a condition relaxing unit for relaxing the switching conditions to ease selection of the first torque request value in accordance with progress of the shift operation.

According to the invention of the above aspect, at the start of the shift operation, i.e., when necessity to raise the rotational speed of the second power source is the highest, the switching conditions are set so as to control the second power source depending on the second torque request according to changes in rotational speed caused by the shift operation. When the necessity to raise the rotational speed of the second power source lowers according to the progress of the shift operation, the switching conditions are relaxed to allow easier selection of the first torque request value according to the drive operation. Thereby, the rotational speed of the second power source can be reliably raised to avoid a delay in shift operation, and a response of a vehicle's behavior to the drive operation can be maintained. Accordingly, it is possible to switch appropriately the torque request value between that corresponding to the drive operation and that corresponding to the rotational speed changes.

Preferably, the condition relaxing unit determines a relaxing amount of the switching conditions according to a progress degree of the shift operation.

Further preferably, the progress degree of the shift operation is calculated from a degree of attainment of the rotational speed of the second power source with respect to a target rotational speed according to the second gear ratio.

Preferably, the condition relaxing unit relatively advances relaxing timing of the switching conditions as an increasing rate of the rotational speed of the second power source increases.

Preferably, the switching conditions include a threshold to be compared with the first torque request value, the control unit selects the first torque request value when the first torque request value exceeds the threshold, and the condition relaxing unit relaxes the switching conditions by changing the threshold to a value smaller than that at the start of the shift operation.

Further preferably, the threshold includes a first threshold for switching the selection from the first torque request value to the second torque request value, and a second threshold for switching the selection from the second torque request value to the first torque request value, and the condition relaxing unit relaxes the switching conditions by changing the first and second thresholds to values smaller than those at the start of the shift operation, respectively.

Preferably, the first producing unit increases the first torque request value such that a section of an increasing rate smaller than that in the other section may be present, when the torque of the second power source is increased according to the drive operation.

Preferably, the first power source is formed of an engine, and the second power source is formed of an electrical rotating machine.

According to another aspect, the invention provides a vehicle including one of the foregoing hybrid driving apparatus.

The invention can implement the hybrid driving apparatus that controls the power source by appropriately selecting the torque request value between that corresponding to the drive operation and that corresponding to the rotational speed changes caused by the shift operation, in the shift operation from the currently selected gear ratio to the larger gear ratio, as well as the vehicle provided with the same.

BRIEF DESCRIPTION OF THE DRAWINGS

FIGS. 10A to 10D are diagrams showing changes in switching condition according to modifications of the embodiment of the invention.

BEST MODES FOR CARRYING OUT THE INVENTION

Embodiments of the invention will now be described with reference to the drawings. In the following description, the same or corresponding portions bear the same reference numbers, and description thereof is not repeated.

(Structure of Hybrid Driving Apparatus)

Figure 1:
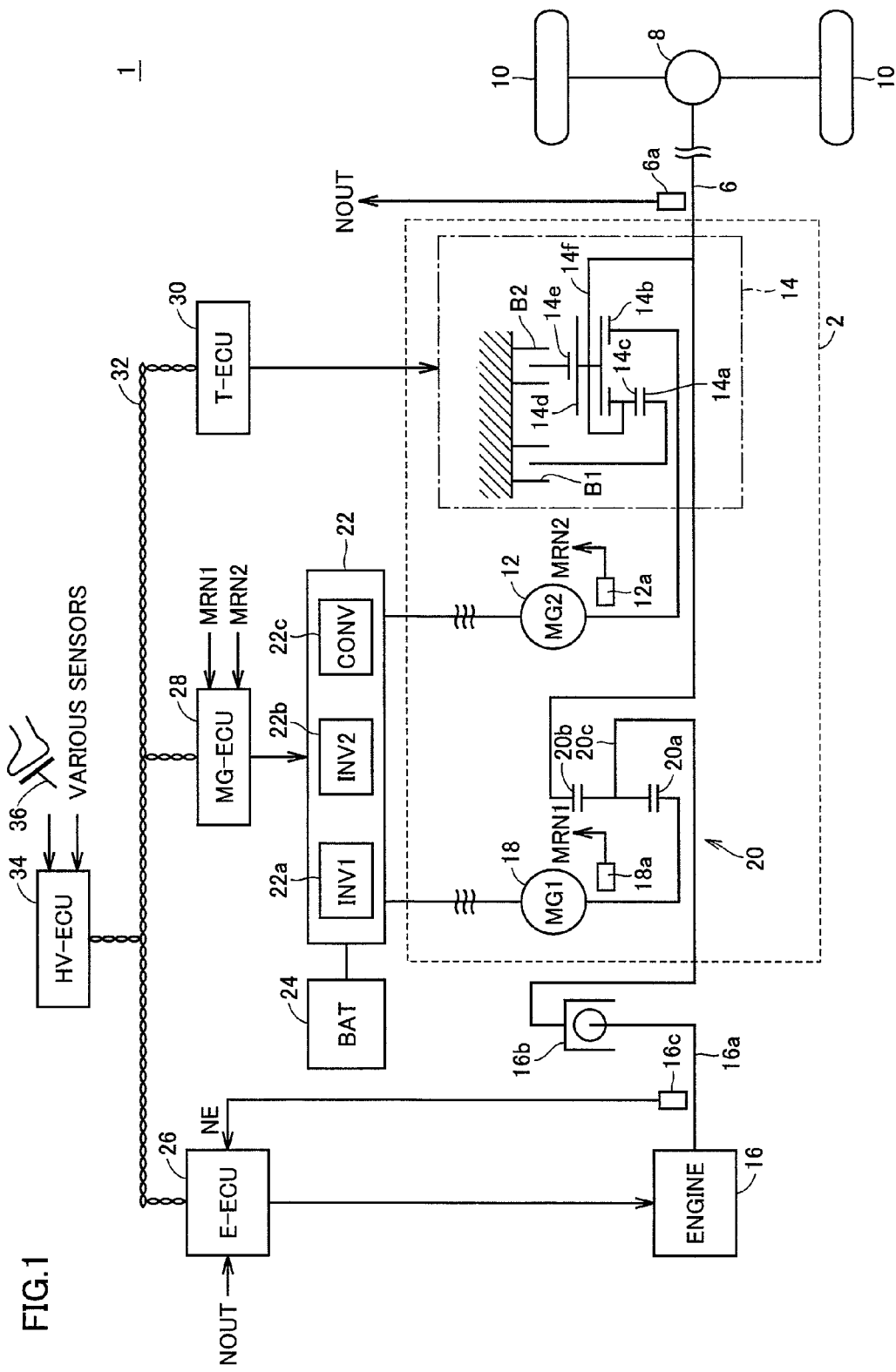
FIG. 1 shows a schematic structure of a hybrid driving apparatus according to an embodiment of the invention.

FIG. 1 shows a schematic structure of a hybrid driving apparatus 1 according to an embodiment of the invention.

Referring to FIG. 1, hybrid driving apparatus 1 according to the embodiment of the invention includes an engine 16 corresponding to a "power source", a transaxle 2, a rotation output shaft 6, a differential gear 8 and drive wheels 10.

The output torque of engine 16 is transmitted to rotation output shaft 6 via transaxle 2, and is further transmitted therefrom to drive wheels 10 via differential gear 8. Transaxle 2 can operate to generate an electric power by receiving a part of an output torque of engine 16, and also to perform selectively power running control for adding a drive power for running to rotation output shaft 6 or regeneration control for collecting energy.

Engine 16 is a known power device such as a gasoline engine or a diesel engine that outputs the power by burning fuel, and is configured to allow electric control of drive states such as an opening position of throttle (intake quantity), a fuel supply quantity and ignition timing. This control is performed, e.g., by an electronic control unit (E-ECU) 26 for engine 16 having a microcomputer as a major component.

Transaxle 2 is primarily formed of a planetary gear mechanism 20 corresponding to an "output distribution mechanism", a first motor generator 18 corresponding to a "power generator", a second motor generator 12 corresponding to an "electric motor" and a transmission mechanism 14. Second motor generator 12 is mechanically connected to rotation output shaft 6 via transmission mechanism 14. Thereby, a torque transmitted between second motor generator 12 and rotation output shaft 6 can be changed according to a gear ratio determined by transmission mechanism 14.

Planetary gear mechanism 20 combines or distributes the torques of or for engine 16, first motor generator 18 and rotation output shaft 6. Thus, planetary gear mechanism 20 can become either an "output combining mechanism" or an "output distributing mechanism". More specifically, planetary gear mechanism 20 is a known gear mechanism that performs a differential operation using three rotation elements, i.e., a sun gear 20a that is an external tooth gear, a ring gear 20b that is an internal tooth gear arranged coaxially with sun gear 20a and a carrier 20c holding a pinion gear meshing with sun gear 20a and ring gear 20b for rotation around its own axis and revolution around sun gear 20a. An output shaft (i.e., crankshaft in this embodiment) of engine 16 is coupled to carrier 20c via a damper 16b. Thus, carrier 20c is an input element of planetary gear mechanism 20.

First motor generator 18 is connected to sun gear 20a. Therefore, sun gear 20a is a so-called reaction element, and ring gear 20b is an output element. Ring gear 20b is coupled as an output member to rotation output shaft 6.

E-ECU 26 detects a rotation state of an output shaft 16a (engine rotational speed NE) by a rotational speed sensor 16c, and also detects a rotation state of rotation output shaft 6 (output shaft rotational speed NOUT) by a rotational speed sensor 6a.

First motor generator 18 (which may also be referred to as an "MG1" hereinafter) is formed of, e.g., a synchronous electric motor, has both a function as the electric motor and a function as the electric power generator, and is electrically connected to a power storage device (BAT) 24 such as a battery via a power control unit 22. A first inverter (INV1) 22a of power control unit 22 can be controlled to govern appropriately the output torque of first motor generator 18 (power running torque or regenerative torque). For this setting, the device employs an electronic control unit (MG-ECU) 28 primarily formed of a microcomputer for controlling the motor generators.

In this embodiment, a setting for generating a regenerative torque is provided to first motor generator 18 so that first motor generator 18 operates as an electric power generator. MG-ECU 28 detects a rotation state of first motor generator 18 (an MG1 rotational speed MRN1) by a rotational speed sensor 18a.

Second motor generator (which may also be referred to as an "MG2" hereinafter) 12 is likewise formed of a synchronous electric motor, and has both a function as an electric motor and a function as a power generator. MG-ECU 28 controls a second inverter (INV2) 22b of power control unit 22 to select the power running operation for outputting the torque and the regenerative operation for collecting energy and to set appropriately the output torques in the respective operations. MG-ECU 28 detects the rotation state of second motor generator 12 (an MG2 rotational speed MRN2) by a rotational speed sensor 12a.

In addition to inverters 22a and 22b, power control unit 22 further includes a boost converter (CONV) 22c for boosting the power supplied from power storage device 24 and supplying the results to inverters 22a and 22b. MG-ECU 28 also controls this boost converter 22c.

Transmission mechanism 14 can selectively form a plurality of gear ratios (e.g., a low gear Lo and a high gear Hi) by a combination of engagement and release of a plurality of frictional engagement devices. This transmission mechanism 14 can be appropriately designed to form low gear Lo of a gear ratio larger than "1". When second motor generator 12 performs the power running to output the torque, the above configuration can increase the output torque of second motor generator 12 for transmitting it to rotation output shaft 6. Therefore, the capacity and/or sizes of second motor generator 12 can be reduced.

Further, it is preferable that second motor generator 12 keeps its drive efficiency in a good state. Therefore, when the rotational speed of rotation output shaft 6 increases, e.g., according to a vehicle speed, high gear Hi of a smaller gear ratio is selected to lower the rotational speed of second motor generator 12. Further, when the rotational speed of rotation output shaft 6 lowers, low gear Lo may be selected again.

The "gear ratio" in the description is a value obtained by dividing the rotational speed transmitted from second motor generator 12 to transmission mechanism 14 by the corresponding output rotational speed transmitted from transmission mechanism 14 to rotation output shaft 6. Thus, when the gear ratio is larger than "1", a power lower in rotational speed and larger in torque than that of second motor generator 12 is transmitted to rotation output shaft 6.

More specifically, transmission mechanism 14 is formed of a set of Ravigneaux type planetary gear mechanisms. More specifically, transmission mechanism 14 is provided with external tooth gears, i.e., first and second sun gears 14a and 14b. First sun gear 14a meshes with a short pinion 14c, which meshes with a long pinion 14d having a larger axial length. Long pinion 14d further meshes with a ring gear 14e arranged coaxially with sun gears 14a and 14b. A carrier 14f carries each of pinions 14c and 14d for rotation on its own axis and revolution. Second sun gear 14b meshes with long pinion 14d. Therefore, first sun gear 14a and ring gear 14e form a mechanism corresponding to a double pinion type planetary gear mechanism together with respective pinions 14c and 14d, and second sun gear 14b and ring gear 14e form a mechanism corresponding to a single pinion type planetary gear mechanism together with long pinion 14d.

There are arranged a first brake B1 selectively fixing first sun gear 14a as well as a second brake B2 selectively fixing ring gear 14e. These brakes B1 and B2 are friction engagement devices producing an engaging force by a frictional force, and may be formed of multiplate type engaging devices or band type engaging devices, respectively. Each of brakes B1 and B2 is typically configured to change continuously its torque capacity according to an engaging force produced by a hydraulic pressure.

Further, second sun gear 14b is coupled to second motor generator 12, and carrier 14f is coupled to rotation output shaft 6. In transmission mechanism 14, therefore, second sun gear 14b is an input element, and carrier 14f is an output element. When first brake B1 is engaged and second brake B2 is released, high gear Hi is set. When first brake B1 is released and second brake B2 is engaged, low gear Lo of a larger gear ratio is set.

The shift operation between the different gears is executed based on running states such as a vehicle speed and a required drive force (or an accelerator press-down degree). More specifically, gear ranges are predetermined as a map (shift diagram), and the control is performed to set one of the gears according to the detected running state. An electronic control unit (T-ECU) 30 for shift control primarily formed of a microcomputer is employed for performing the above control.

For achieving optimum drive efficiency as a whole, there is further arranged an electronic control unit (HV-ECU) 34 that is primarily formed of a microcomputer for distributing the torque request values and rotational speeds to engine 16 and first and second motor generators 18 and 12 according to information about the drive operation and running status provided from various sensors including an accelerator pedal press-down degree sensor 36 providing the accelerator press-down degree.

Electronic control units 26, 28, 30, and 34 are mutually connected via a communication link 32 for data communications between them, and cooperate with each other to execute the control processing.

For example, in this embodiment, HV-ECU 34 produces a "run control torque request value" corresponding to the drive operation, and T-ECU 30 produces a "shift control torque request value" corresponding to the changes in rotational speed caused by the shift operation. During a period of the shift operation, one of the "run control torque request value" and the "shift control torque request value" becomes active according to the switching conditions based on the "shift control torque request value", and MG-ECU 28 controls the output torque of second motor generator 12 according to this active torque request value.

Figure 2:
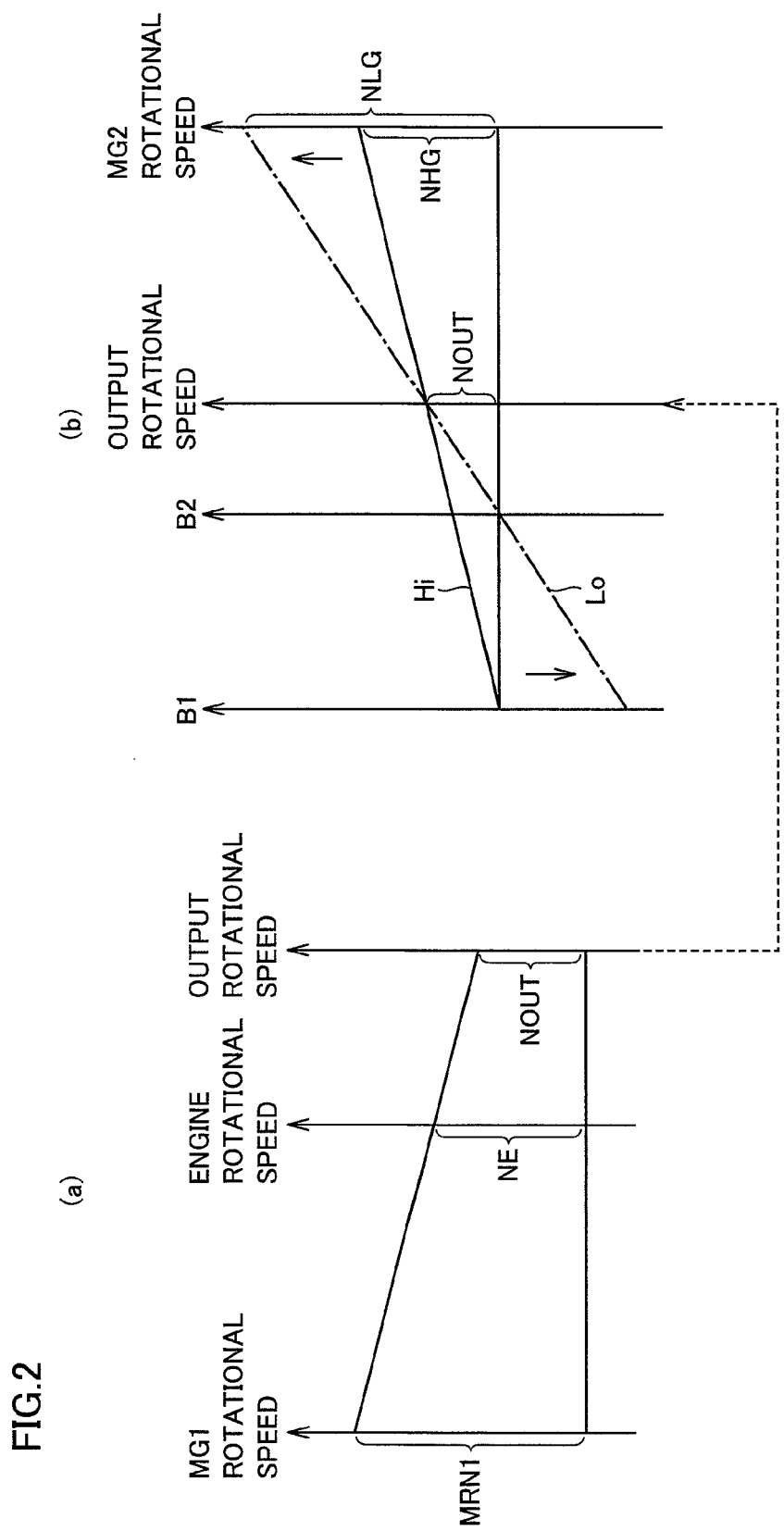
FIG. 2 shows alignment charts between an engine and first and second motor generators.

FIG. 2 shows alignment charts between engine 26 and first and second motor generators 18 and 12.

FIG. 2(a) shows an alignment chart relating to planetary gear mechanism 20. Referring to FIGS. 1 and 2(a), when sun gear 20a receives a reaction force torque produced by first motor generator 18 to the output torque of engine 16 applied to carrier 20c, a torque smaller than the torque supplied from engine 16 appears on ring gear 20b forming the output element. Therefore, a part of the output torque of engine 16 is distributed to first motor generator 18, and the remainder is distributed to rotation output shaft 6. First motor generator 18 receiving this distributed torque functions as a power generator.

The rotational speed of first motor generator 18 (MG1 rotational speed MRN1), the rotational speed of engine 16 (engine rotational speed NE) and the rotational speed of ring gear 20b (output shaft rotational speed NOUT) are arranged on a straight line determined according to gear ratios between the elements of planetary gear mechanism 20. Therefore, when the rotational speed of ring gear 20b (NOUT) is constant, the rotational speed of first motor generator 18 (MRN1) can be appropriately changed so that the rotational speed of engine 16 (NE) can be changed continuously, i.e., in a stepless fashion. Thus, by controlling the rotational speed of first motor generator 18, engine 16 can be operated in the most efficient rotational speed range.

FIG. 2(b) shows an alignment chart relating to the Ravigneaux type planetary gear mechanism included in transmission mechanism 14. Referring to FIGS. 1 and 2(b), when second brake B2 is engaged to fix ring gear 14e, low gear Lo is set. When first brake B1 is engaged to fix first sun gear 14a, high gear Hi of a smaller gear ratio than low gear Lo is set.

When low gear Lo is set, the output torque of second motor generator 12 is boosted according to the gear ratio and is added to rotation output shaft 6. Conversely, when high gear Hi is set, the torque supplied from second motor generator 12 is boosted at a smaller increasing rate than low gear Lo, and is added to rotation output shaft 6. The torque added to rotation output shaft 6 is positive when second motor generator 12 is in the drive state (power running state), and is negative when it is in a driven state (regenerative state).

The rotational speed of second motor generator 12 (MG2 rotational speed MRN2) and the rotational speed of ring gear 20b (output shaft rotational speed NOUT) are arranged on a straight line determined according to gear ratios between the elements forming transmission mechanism 14. Therefore, assuming that the rotational speed of carrier 14f (output shaft rotational speed NOUT) is constant, the rotational speed of second motor generator 12 is equal to a high-gear rotational speed NHG when high gear Hi is set, and will rise to a low-gear rotational speed NLG when low gear Lo is set.

Hybrid driving apparatus 1 shown in FIG. 1 drives engine 16 as efficiently as possible to reduce an amount of emissions and simultaneously to improve fuel consumption. The motor generator can perform energy regeneration, and this also improves the fuel consumption. Therefore, when a large drive power is required, second motor generator 12 operates to add its torque to rotation output shaft 6 while engine 16 is transmitting its output torque to rotation output shaft 6. In this case, when the vehicle speed is low, transmission mechanism 14 is set to low gear Lo to increase the torque thus added. When the vehicle speed increases thereafter, transmission mechanism 14 is set to high gear Hi to lower the rotational speed of second motor generator 12. The purpose of this is to keep the good drive efficiency of second motor generator 12 and thereby to prevent lowering of the fuel consumption.

Conversely, when a braking operation is performed during running at a certain vehicle speed, second motor generator 12 enters the driven state to perform the energy regeneration. When the vehicle speed lowers, the shift operation from high gear Hi to low gear Lo takes place.

(Shift Operation from High Gear Hi to Low Gear Lo According to Related Art)

Description will now be given on the output torque control of second motor generator 12 in the above shift operation from high gear Hi to low gear Lo. First, description will be given on a related art that performs the switching between the "run control torque request value" and the "shift control torque request value" based on a comparison between the "shift control torque request value" and a constant threshold (i.e., based on switching conditions). In the following description, a control mode in which the "run control torque request value" is active is also referred to as a "power ON control", and a control mode in which the "shift control torque request value" is active is also referred to as a "power OFF control".

Figure 3:
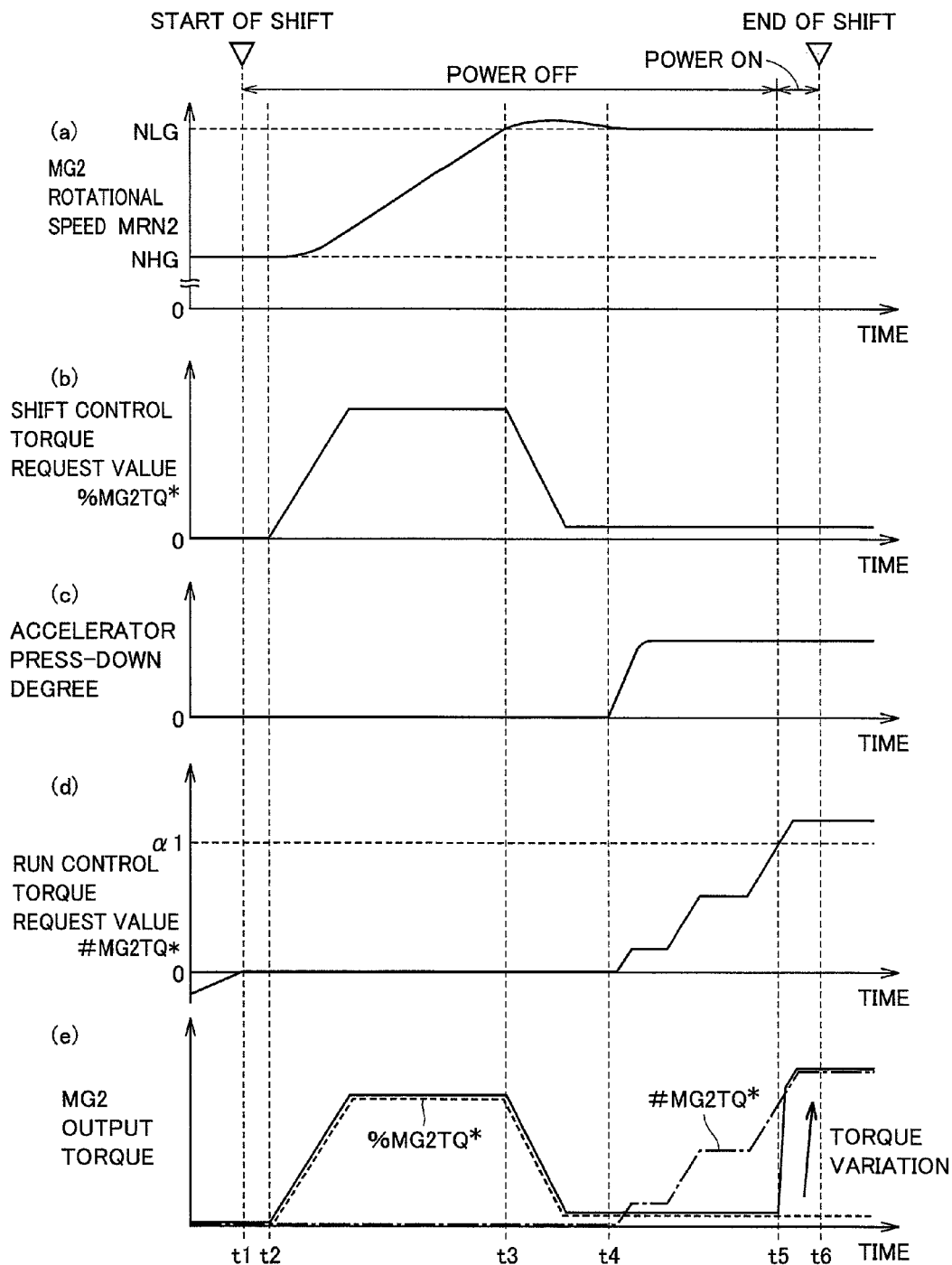
FIG. 3 is a timing chart showing a shift operation from a high gear to a low gear according to a related art.

FIG. 3 is a timing chart showing a shift operation from a high gear to a low gear according to the related art. FIG. 3(a) shows MG2 rotational speed MRN2. FIG. 3(b) shows a shift control torque request value % MG2TQ*. FIG. 3(c) shows an accelerator press-down degree. FIG. 3(d) shows a run control torque request value #MG2TQ*. FIG. 3(e) shows an output torque of the MG2.

During a period of the shift operation shown in FIG. 3, when run control torque request value #MG2TQ* exceeds a threshold α1 (fixed value), the control is switched from the "power OFF control" to the "power ON control".

When the running vehicle decreases its speed and the shift conditions for shifting from high gear Hi to low gear Lo are satisfied, a shift request is issued to start the shift operation (time t1). First, as shown in FIG. 3(b), shift control torque request value % MG2TQ* starts to increase at time t2 for raising MG2 rotational speed MRN2 to a target rotational speed (low-gear rotational speed NLG) corresponding to low gear Lo. When the driver does not operate (depress) the accelerator pedal, the accelerator press-down degree keeps a value of zero as shown in FIG. 3(c) so that run control torque request value #MG2TQ* likewise keeps a value of zero as shown in FIG. 3(d). Consequently, the "power OFF control" is selected, and the MG2 output torque increases according to shift control torque request value % MG2TQ* as shown in FIG. 3(e). After shift control torque request value % MG2TQ* rises to a predetermined value, it keeps this predetermined value (times t2 to t3 in FIG. 3(b)).

The above changes in shift control torque request value % MG2TQ* raise MG2 rotational speed MRN2 from low-gear rotational speed NLG to high-gear rotational speed NHG. A period during which MG2 rotational speed MRN2 rises from high-gear rotational speed NHG to low-gear rotational speed NLG may also be referred to as an "inertia phase". Shift control torque request value % MG2TQ* is a torque request value for ensuring the reliable pulling up of MG2 rotational speed MRN2 to low-gear rotational speed NLG in this inertia phase. Thus, when the driver does not operate the accelerator pedal so that run control torque request value #MG2TQ* is smaller than threshold α1, shift control torque request value % MG2TQ* is adapted for ensuring the MG2 output torque. Thereby, such a situation can be avoided that the time required for completing the shift operation increases depending on whether or not the drive operation is performed. As described above, shift control torque request value % MG2TQ* is a torque request value depending on the changes in rotational speed caused by the shift operation.

When MG2 rotational speed MRN2 exceeds low-gear rotational speed NLG at time t3 as shown in FIG. 3(a), shift control torque request value % MG2TQ* decreases to a predetermined value or lower as shown in FIG. 3(b). This is performed for reducing a shock at the time of brake engagement, and may also be referred to as "torque down". The MG2 output torque decreases as shown in FIG. 3(e) according to the decrease in shift control torque request value % MG2TQ*.

When a difference between MG2 rotational speed MRN2 and low-gear rotational speed NLG stays in a predetermined range for a certain time, the engagement determination is performed and the brake implementing low gear Lo is engaged so that the shift operation ends (time t6).

At a time t4, when the driver operates the accelerator pedal as shown in FIG. 3(c), run control torque request value #MG2TQ* starts to increase as shown in FIG. 3(d) in accordance with the increase in accelerator press-down degree. When run control torque request value #MG2TQ* exceeds threshold α1 (time t5), the control changes from the "power OFF control" to the "power ON control". Thereby, the MG2 output torque starts to change to the value corresponding to run control torque request value #MG2TQ* at time t5.

Consequently, the MG2 output torque rapidly changes by the difference (nearly equal to threshold α1) between run control torque request value #MG2TQ* and shift control torque request value % MG2TQ* at time t5. Consequently, the drive torque transmitted to drive wheels 10 via rotation output shaft 6 rapidly changes so that the person(s) on the vehicle may feel a shock.

Shift Operation from High Gear Hi to Low Gear Lo According to the Embodiment

Hybrid driving apparatus 1 according to the embodiment relaxes the switching conditions (e.g. threshold in this embodiment) for allowing further easy selection of run control torque request value #MG2TQ* at the start of the shift operation, i.e., for allowing further easy selection of the "power ON control".

Figure 4:
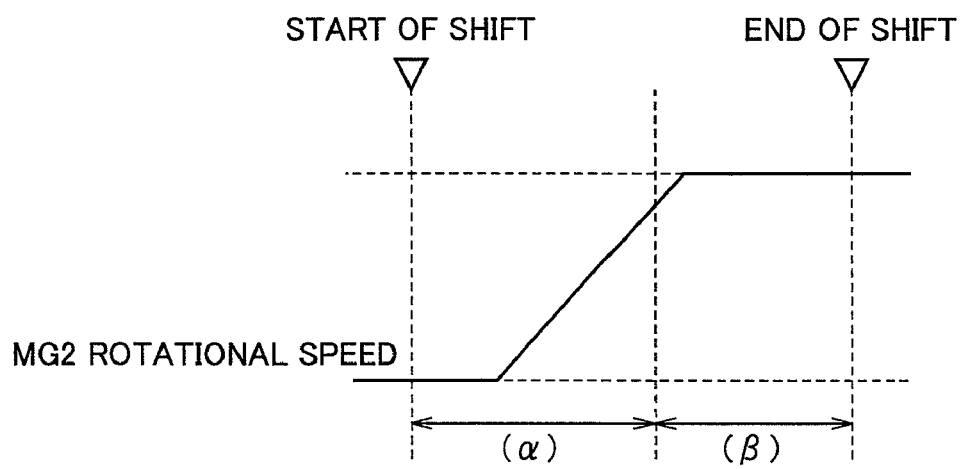
FIG. 4 schematically shows changes in MG2 rotational speed during the shift operation from the high gear to the low gear.

FIG. 4 schematically shows changes in MG2 rotational speed during the shift operation from high gear Hi to low gear Lo.

Referring to FIG. 4, since the MG2 output torque that can reliably raise MG2 rotational speed MRN2 must be ensured during period α, i.e., the first half of the shift operation, it is desired to switch the control from the "power OFF control" to the "power ON control" only when run control torque request value #MG2TQ* is relatively large.

In a period β, since MG2 rotational speed MRN2 has attained a raised value equal or close to the target rotational speed, the necessity to generate the MG2 torque for raising MG2 rotational speed MRN2 is relatively low. Rather than such generation, it is desired to switch the control from the "power OFF control" to the "power ON control" in an early stage and thereby to enhance the response to the drive operation for preventing the driver from feeling a time lag.

Accordingly, hybrid driving apparatus 1 according to the embodiment relaxes the switching conditions for switching from the "power OFF control" to the "power ON control" in accordance with the progress of the shift operation, and thereby the embodiment ensures the reliable execution of the shift operation, and also keeps the response to the drive operation. Further, the embodiment avoids generation of a shock feeling that may be caused by rapid changes in MG2 output torque at the time of switching from the "power OFF control" to the "power ON control", e.g., shown in FIG. 4.

Figure 5A:
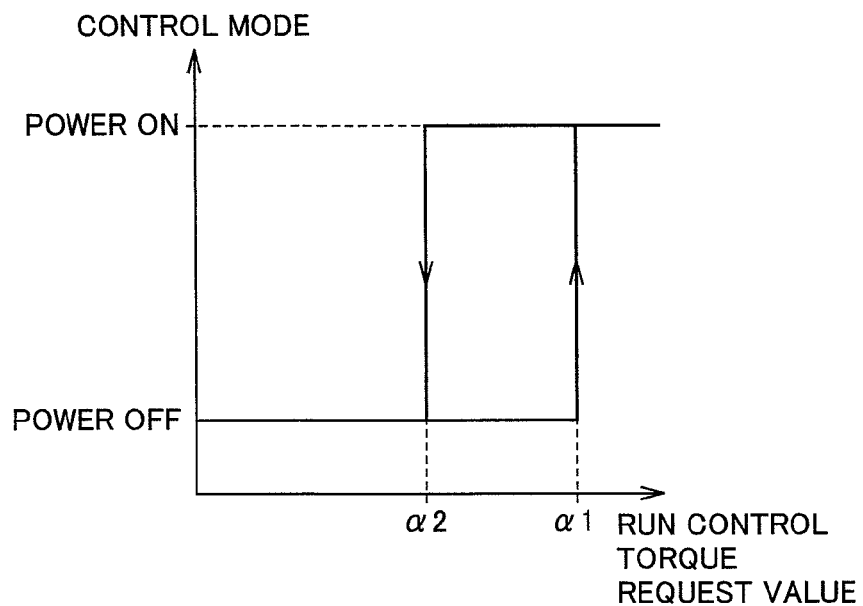
FIGS. 5A and 5B specifically show switching conditions for "power OFF control" and "power ON control".
Figure 5B:
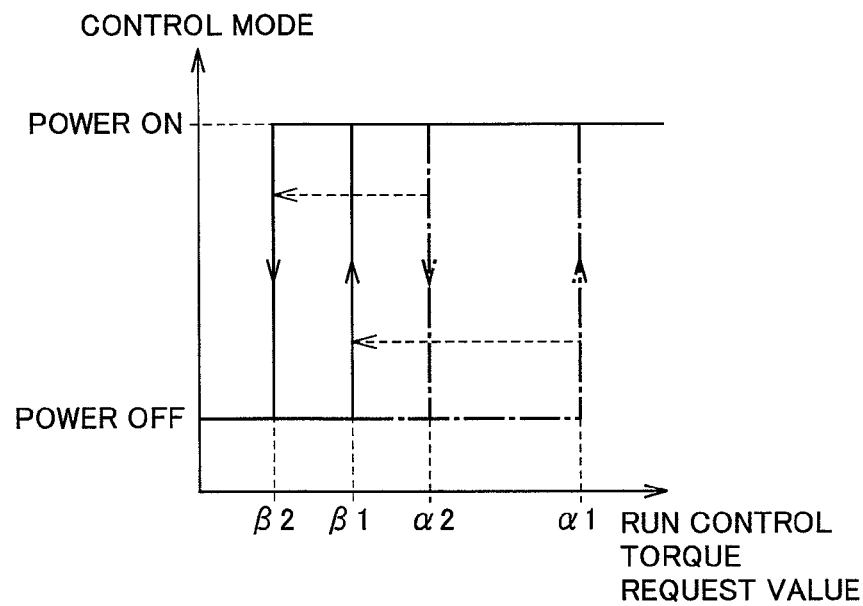

FIGS. 5A and 5B specifically show the switching conditions for the "power OFF control" and the "power ON control".

FIG. 5A shows switching conditions according to a related art. Referring to FIG. 5A, it is desired to adapt the switching conditions having hysteresis characteristics for preventing repetitive generation of the switching operation between the "power OFF control" and the "power ON control". More specifically, the switching conditions are defined by threshold α1 for switching from the "power OFF control" to the "power ON control" and a threshold α2 for switching from the "power ON control" to the "power OFF control". In this related art, both thresholds α1 and α2 are fixed values.

FIG. 5B shows the switching conditions according to the embodiment. Referring to FIG. 5B, thresholds α1 and α2 that are set at the start of the shift operation are changed, during a period of the shift operation, toward thresholds β1 and β2 smaller than thresholds α1 and α2, respectively. Further, the quantities of change of the thresholds are determined according to a shift progress degree PRG.

Figure 6:
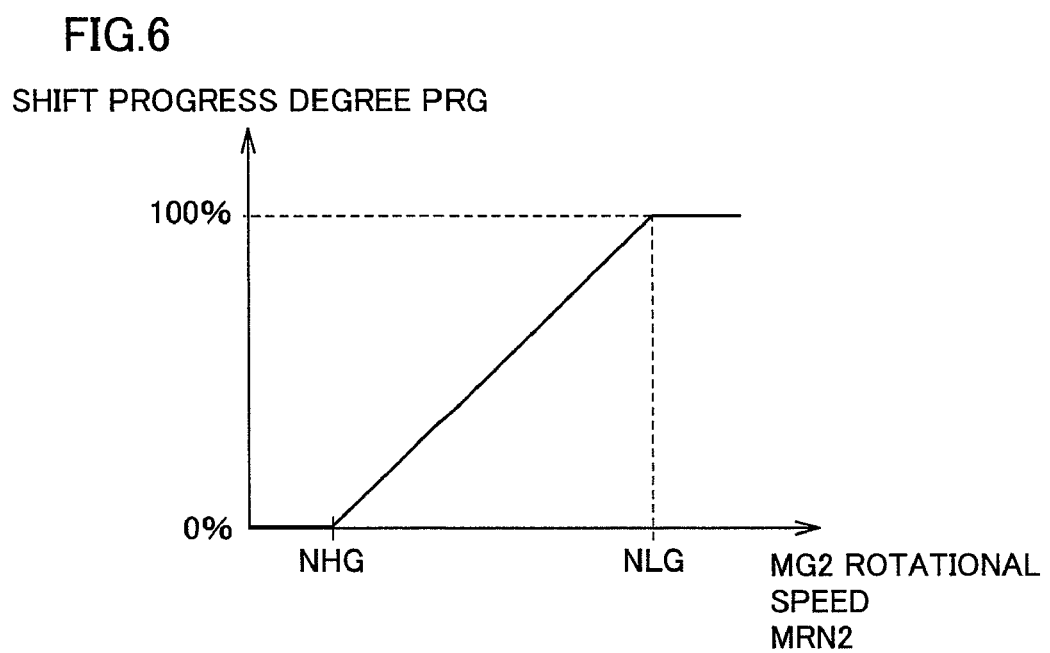
FIG. 6 illustrates a method of calculating a shift progress degree PRG.

FIG. 6 illustrates a method of calculating shift progress degree PRG. Referring to FIG. 6, the magnitude of MG2 rotational speed MRN2 defines shift progress degree PRG in the shift operation from high gear Hi to low gear Lo. Thus, when MG2 rotational speed MRN2 is equal to high-gear rotational speed NHG, shift progress degree PRG is 0%. When MG2 rotational speed MRN2 is equal to low-gear rotational speed NLG, shift progress degree PRG is 100%. Thus, shift progress degree PRG indicates a degree of attainment of present MG2 rotational speed MRN2 with respect to the target rotational speed corresponding to low gear Lo, and means a degree of completion of the shift process from high gear Hi to low gear Lo.

When the shift operation starts (shift progress degree PRG=0%), thresholds α1 and α2 shown in FIG. 5B are set. As shift progress degree PRG increases, thresholds α1 and α2 change toward β1 and β2, respectively. When MG2 rotational speed MRN2 attains low-gear rotational speed NLG (shift progress degree PRG=100%), thresholds β1 and β2 are set. Correspondences between shift progress degree PRG and the quantities of changes in threshold may be linear or nonlinear. For example, when shift progress degree PRG is equal to or smaller than a predetermined value, e.g., of 80%, thresholds α1 and α2 are continuously set. In a range exceeding the predetermined value (e.g., 80% to 100%), the respective thresholds may gradually lower to attain thresholds β1 and β2 when shift progress degree PRG is 100%.

(Control Structure)

Figure 7:
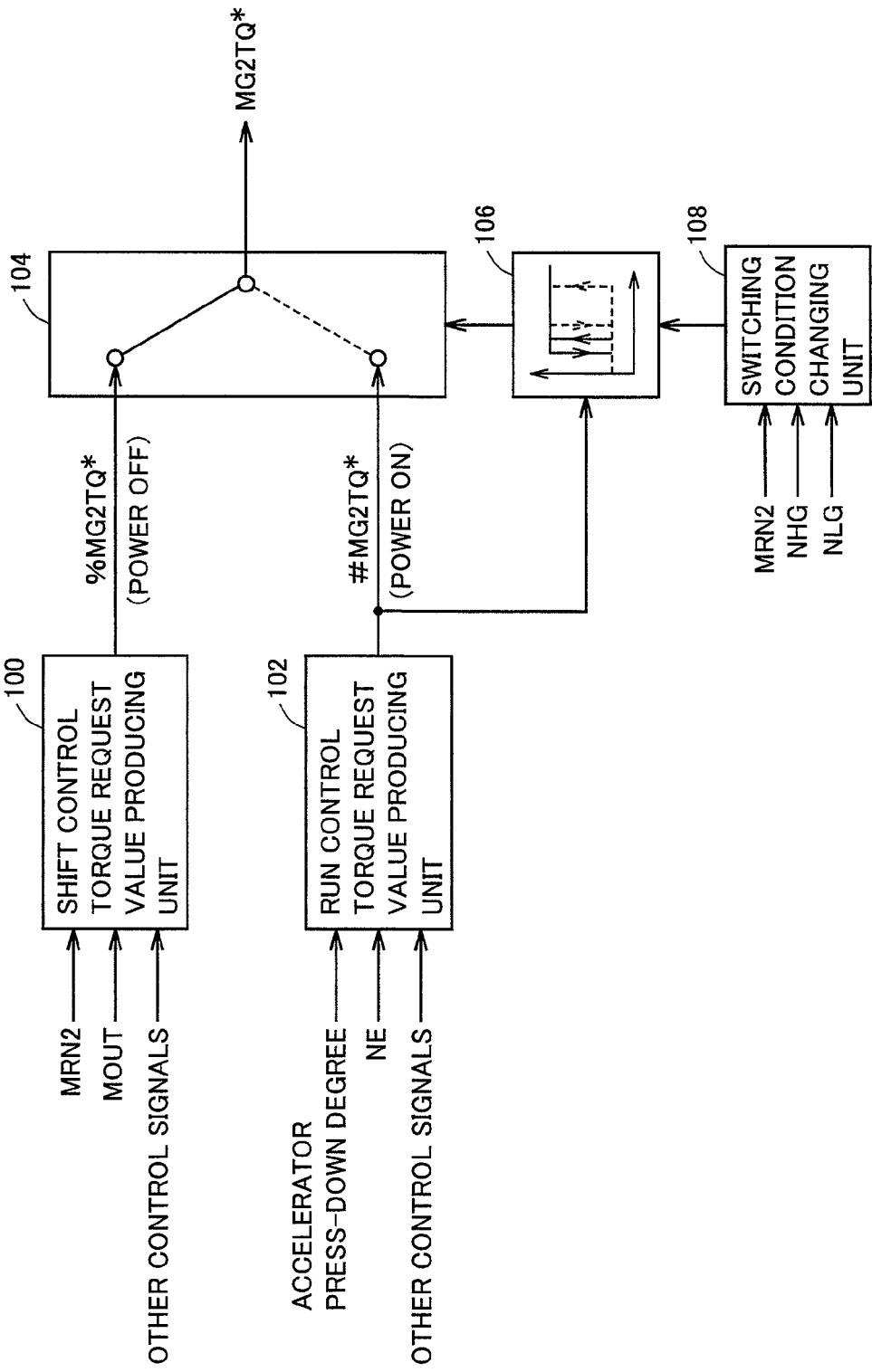
FIG. 7 is a function block diagram showing a substantial portion of a control structure according to the embodiment of the invention.

FIG. 7 is a functional block diagram showing a substantial portion of the control structure according to the embodiment of the invention. The control structure shown in FIG. 7 can be implemented by electronic control units 28, 30 and 34 in FIG. 1 that cooperate to execute processing corresponding to the various function blocks according to prestored programs.

Referring to FIG. 7, the control structure according to the embodiment includes a run control torque request value producing unit 102 for producing run control torque request value #MG2TQ* according to the drive operation, and a shift control torque request value producing unit 100 for producing a shift control torque request value % MG2TQ* corresponding to the rotational speed changes according to the shift operation. Run control torque request value producing unit 102 is implemented by HV-ECU 34, and shift control torque request value producing unit 100 is implemented by T-ECU 30.

Run control torque request value producing unit 102 produces run control torque request value #MG2TQ* based on the accelerator press-down degree, engine rotational speed NE and other control signals. Further, shift control torque request value producing unit 100 produces shift control torque request value % MG2TQ* based on MG2 rotational speed MRN2, output shaft rotational speed NOUT and other control signals.

Shift control torque request value % MG2TQ* and run control torque request value #MG2TQ* are transmitted to a switching unit 104, and one of the torque request values, i.e., the torque request value selected according to the switching signal provided from a switching condition unit 106 is output as an MG2 torque request value MG2TQ*. This MG2 torque request value MG2TQ* is transmitted to MG-ECU 28, and the output torque of the MG2 is controlled using power control unit 22.

Switching condition unit 106 compares run control torque request value #MG2TQ* with the threshold that is set by switching performed by a switching condition changing unit 108, and provides the switch signal indicating the torque request value to be selected to switching unit 104.

Switching condition changing unit 108 calculates shift progress degree PRG based on MG2 rotational speed MRN2, high-gear rotational speed NHG and low-gear rotational speed NLG, and sets the threshold corresponding to calculated shift progress degree PRG in switching condition unit 106 according to the foregoing manner.

When the threshold changes according to shift progress degree PRG as described above, effects are achieved as described below with reference to FIG. 8.

Figure 8:
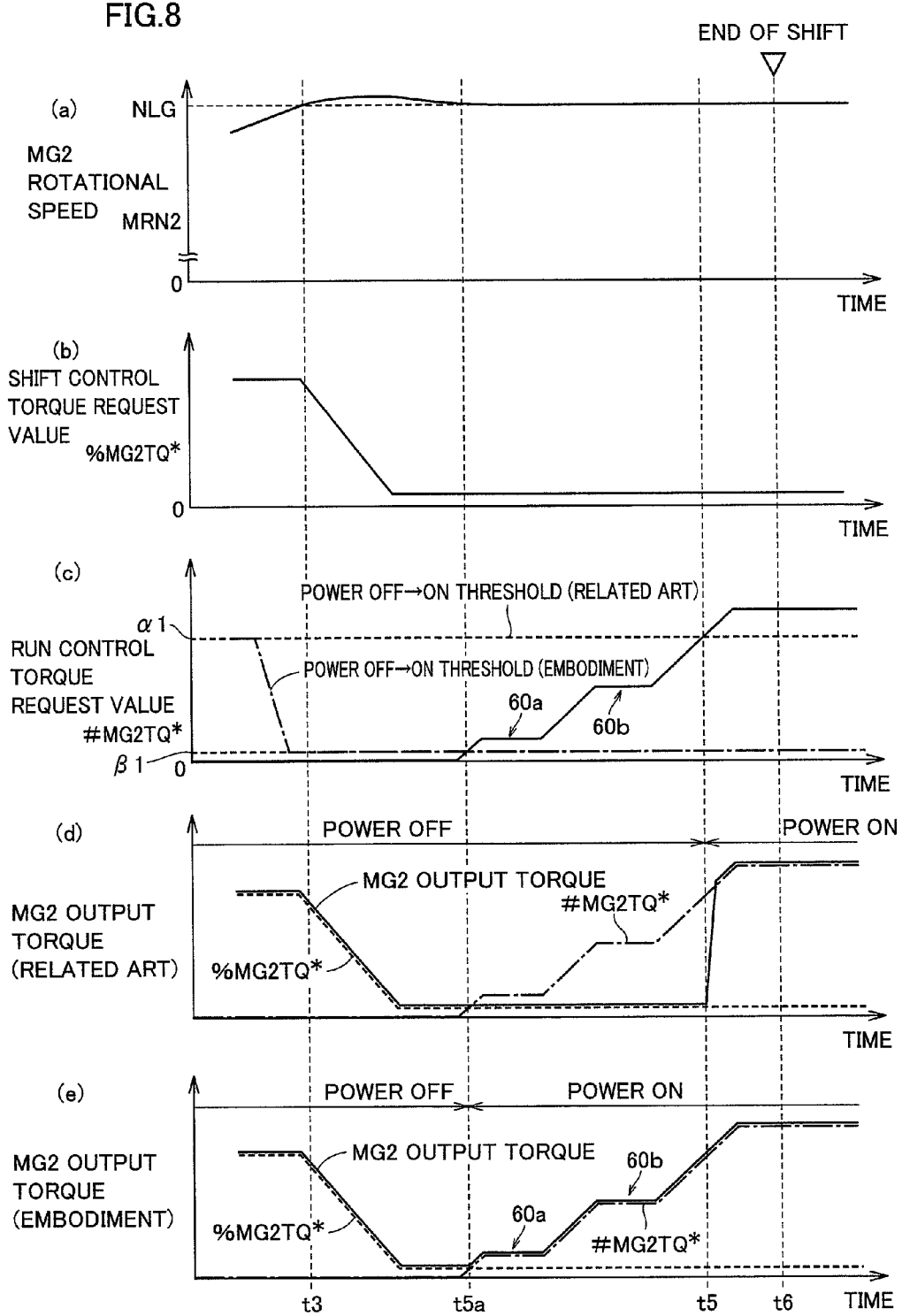
FIG. 8 is a timing chart showing the shift operation from the high gear to the low gear according to the embodiment of the invention.

FIG. 8 is a timing chart showing the shift operation from the high gear to the low gear according to the embodiment of the invention. FIG. 8 shows a range to be compared with the range between times t3 and t6 in the foregoing timing chart of FIG. 3. FIG. 8(*a*) shows MG2 rotational speed MRN2. FIG. 8(*b*) shows shift control torque request value % MG2TQ*. FIG. 8(*c*) shows run control torque request value #MG2TQ*. FIG. 8(*d*) shows the output torque of the MG2 in the related art. FIG. 8(*e*) shows the output torque of the MG2 in this embodiment.

As shown in FIG. 8(*a*), when MG2 rotational speed MRN2 reaches low-gear rotational speed NLG that is the target value, the value of shift progress degree PRG increases so that the threshold for the switching from the "power OFF control" to the "power ON control" gradually lowers. At time t3, the threshold is set to β1.

When the driver operates the accelerator pedal thereafter as shown in FIG. 3(*c*), run control torque request value #MG2TQ* starts to increase as shown in FIG. 8(*c*). During this increase, sections 60*a* and 60*b* in which an increasing rate of run control torque request value #MG2TQ* is smaller than that in the other section are set. These sections 60*a* and 60*b* are employed for reducing a shock caused by the changes in MG2 output torque, and are also referred to as wait control.

More specifically, section 60*a* is employed for reducing rattling noises that may be caused by changes in meshing state of gears forming differential gear 8 (FIG. 1) when the rotation output shaft changes from a negative (driven) state to a positive (driving) state. When the MG2 output torque changes from a negative to a positive, a stress occurring between the gears inverts its direction so that a positional relationship between the gears changes corresponding to a play of them, and so-called "rattling" occurs. For reducing this rattling, section 60*a* in which the increasing rate is smaller than that in the other section is formed.

Section 60*b* is employed for releasing a torsional stress caused in rotation output shaft 6 and others. More specifically, when the MG2 changes from the driven state to the driving state, the torsional stress generated in rotation output shaft 6 is inverted so that section 60*b* in which the increasing rate is smaller than that in the other section is produced for reducing the rapid torsional changes due to this inversion of the torsional stress.

As can be seen in the related art shown in FIGS. 8(*c*) and 8(*d*), if threshold α1 for switching from the "power OFF control" to the "power ON control" is fixed, the switching from the "power OFF control" to the "power ON control" is performed at time t5 delayed from a time t5*a* so that the output torque of the MG2 rapidly increases at time t5 and does not include torque characteristics corresponding to foregoing sections 60*a* and 60*b*. Therefore, shock feeling appears at time t5, and it is impossible to achieve the shock reducing effect by said waiting control.

In the embodiment shown in FIGS. 8(*c*) and 8(*e*), the threshold for switching from the "power OFF control" to the "power ON control" is set to β1 at time t3 so that run control torque request value #MG2TQ* can reach the switching threshold relatively early (time t5*a*). At time t5*a*, the switching from the "power OFF control" to the "power ON control" is performed. The output torque of the MG2 is controlled according to run control torque request value #MG2TQ*. As shown in FIG. 8(*e*), the output torque of the MG2 includes the torque characteristics corresponding to foregoing sections 60*a* and 60*b*. This can avoids the rapid changes in output torque of the MG2, and can offer the shock reducing effect relating to the wait control.

(Process Flow)

The processing procedures relating to the shift operation from high gear Hi to low gear Lo according to the embodiment already described can be summarized as follows.

Figure 9:
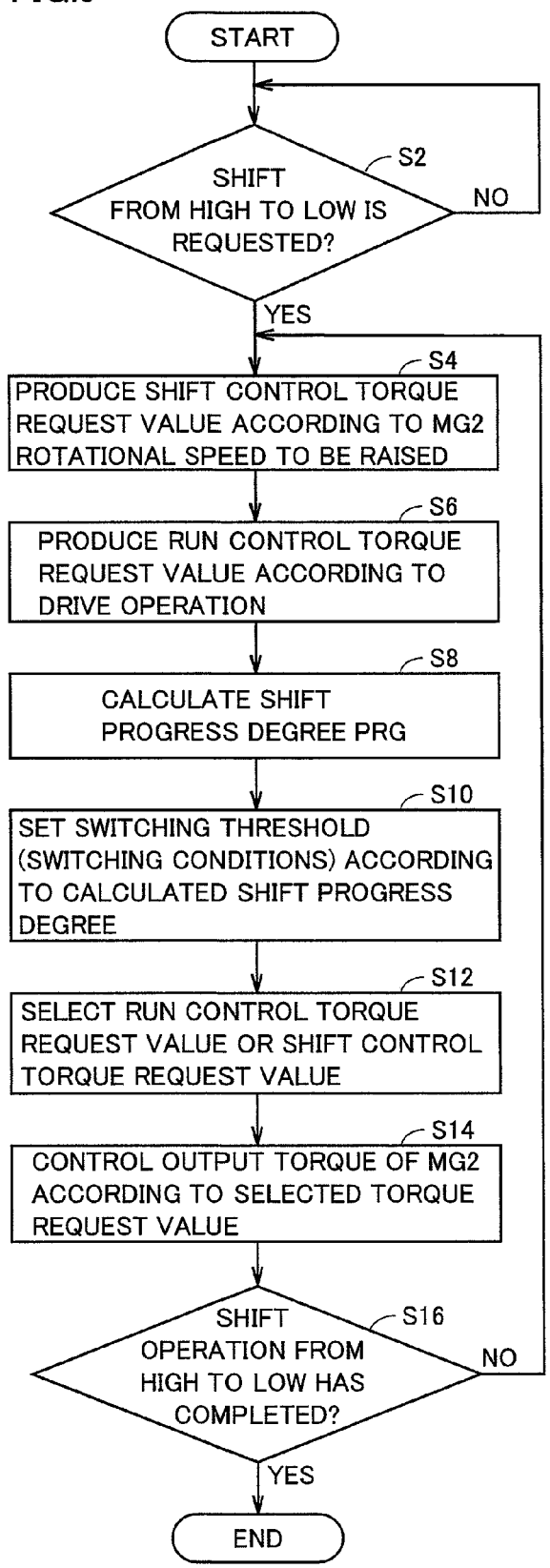
FIG. 9 is a flowchart showing processing procedures relating to the shift operation from the high gear to the low gear according to the embodiment of the invention.

FIG. 9 is a flowchart showing processing procedures relating to the shift operation from the high gear to the low gear according to the embodiment of the invention.

Referring to FIG. 9, it is determined in step S2 whether or not the shift request from high gear Hi to low gear Lo has been issued.

Referring to FIG. 9, it is determined in step S2 whether or not the shift request from high gear Hi to low gear Lo has been issued. When the shift request has not been issued (NO in step S2), the processing in step S2 will be repeated until the shift request is issued.

When the shift request is issued (YES in step S2), shift control torque request value % MG2TQ* is produced according to MG2 rotational speed MRN2 to be raised (step S4). Also, run control torque request value #MG2TQ* is produced according to the drive operation (step S6).

Shift progress degree PRG is calculated based on high-gear rotational speed NHG and low-gear rotational speed NLG (step S8), and the switching threshold (switching conditions) is set corresponding to shift progress degree PRG thus calculated (step S10). One of run control torque request value #MG2TQ* and shift control torque request value % MG2TQ* is selected based on a comparison between the switching threshold thus set and run control torque request value #MG2TQ* (step S12), and the output torque of the MG2 is controlled according to the torque request value thus selected (step S14).

Thereafter, it is determined whether or not the shift operation from high gear Hi to low gear Lo has completed (step S16). When the shift operation has not completed (NO in step S16), the foregoing steps S4 to S16 are repeated.

When the shift operation has completed (YES in step S16), the processing ends. After the end of this processing, the output torque of the MG2 is controlled according to run control torque request value #MG2TQ*.

(Modification)

The embodiment has been described in connection with the structure that changes the threshold corresponding to shift progress degree PRG. However, the apparatus may be configured to change the threshold according to shift progress degree PRG as well as the increasing rate of MG2 rotational speed MRN2, or according to only the increasing rate of MG2 rotational speed MRN2.

More specifically, when the vehicle is significantly decelerating, or when a drag resistance of brake B1 that is released by the shift operation from high gear Hi to low gear Lo is small, MG2 rotational speed MRN2 rises further rapidly to low-gear rotational speed NLG even in the case where the MG2 output torque is generated according to uniform shift control torque request value % MG2TQ*. When the above further rapid rising occurs, it is less necessary to keep the "power OFF control", and it is desired to switch early the control to the "power ON control". Accordingly, when the increasing rate of MG2 rotational speed MRN2 is large, the threshold is reduced at an earlier time. Thereby, the switching from the "power OFF control" to the "power ON control" can be performed according to earlier timing.

FIGS. 10A to 10D are diagrams showing changes in switching condition according to the modification of the embodiment of the invention.

FIG. 10A shows changes in MG2 rotational speed MRN2 with respect to time. FIG. 10B shows changes in MG2 rotational speed MRN2 with respect to time, and particularly the changes at a larger increasing rate than those shown in FIG. 10A.

FIG. 10C shows the changes in threshold with respect to time, and particularly the changes in threshold for switching from the "power OFF control" to the "power ON control" in the case of FIG. 10A. In FIG. 10C, the threshold decreases substantially linearly with increase in MG2 rotational speed MRN2. FIG. 10D shows the changes in threshold with respect to time, and particularly the changes in threshold for switching from the "power OFF control" to the "power ON control" in the case of FIG. 10B. In FIG. 10D, the switching threshold decreases at a larger decreasing rate according to earlier timing, as compared with the case of FIG. 10C. Therefore, the reduction from threshold $\alpha 1$ to $\beta 1$ is executed at an earlier stage.

The correlation between the embodiment of the invention and the present invention is as follows. Engine 16 corresponds to the "first power source", transmission mechanism 14 corresponds to the "transmission mechanism" and second motor generator (MG2) 12 corresponds to the "second power source". Shift control torque request value producing unit 100 produces the "first producing unit", run control torque request value producing unit 102 corresponds to the "second producing unit", switching unit 104 corresponds to the "switching unit", the MG-ECU corresponds to the "control unit" and switching condition changing unit 108 corresponds the "condition relaxing unit".

According to the embodiment, when the shift operation starts and thus the necessity to raise the MG2 rotational speed is high, the switching threshold is set to a relatively high value for ensuring a large MG2 output torque so that the shift control torque request value can be selected more easily. When the shift operation proceeds thereafter and the necessity to raise the MG2 rotational speed becomes low, the switching conditions are relaxed to allow more easy selection of the run control torque request value. Thereby, the MG2 rotational speed can be reliably raised to avoid the delay in shift operation, and it is possible to keep the response of the vehicle behavior with respect to the drive operation.

According to the embodiment, since early timing can be employed for switching from the "power OFF control" to the "power ON control", it is possible to implement reliably the wait control included in the run control torque request value. Therefore, the shock that may occur during increase in MG2 output torque can be reduced.

The embodiment has been described in connection with the structure that uses, as the switching conditions, the threshold to be compared with the run control torque request value. However, this is not restrictive, and switching conditions may be determined in view of the correlation between the shift control torque request value and the run control torque request value.

The embodiment has been exemplified in connection with the transmission mechanism that can selectively form the two gear ratios. However, the transmission mechanism that can selectively form three or more gear ratios can be used. Even when this transmission mechanism is used, similar control can be executed in the shift operation from any gear ratio to a larger gear ratio.

Although the present invention has been described and illustrated in detail, it is clearly understood that the same is by way of illustration and example only and is not to be taken by way of limitation, the scope of the present invention being interpreted by the terms of the appended claims.

The invention claimed is:

1. A hybrid driving apparatus comprising:
   a rotation output shaft for receiving a whole or a part of output from a first power source;
   a transmission mechanism for selectively providing a plurality of gear ratios by a combination of engaging and releasing of a plurality of frictional engagement devices;
   a second power source connected to said rotation output shaft via said transmission mechanism;
   a first producing unit for producing a first torque request value for said second power source according to a drive operation;
   a second producing unit for producing a second torque request value for said second power source according to changes in rotational speed caused by a shift operation;
   a switching unit for selecting one of said first and second torque request values according to switching conditions based on said first torque request value during a period of a shift operation from a first gear ratio to a second gear ratio larger than said first gear ratio;
   a control unit for controlling said second power source according to the torque request value selected by said switching unit; and
   a condition relaxing unit for relaxing said switching conditions to ease selection of said first torque request value in accordance with progress of said shift operation.

2. The hybrid driving apparatus according to claim 1, wherein
   said condition relaxing unit determines a relaxing amount of said switching conditions according to a progress degree of said shift operation.

3. The hybrid driving apparatus according to claim 2, wherein
   the progress degree of said shift operation is calculated from a degree of attainment of the rotational speed of said second power source with respect to a target rotational speed according to said second gear ratio.

4. The hybrid driving apparatus according to claim 1, wherein
   said condition relaxing unit relatively advances relaxing timing of said switching conditions as an increasing rate of the rotational speed of said second power source increases.

5. The hybrid driving apparatus according to claim 1, wherein
   said switching conditions include a threshold to be compared with said first torque request value,
   said control unit selects said first torque request value when said first torque request value exceeds said threshold, and
   said condition relating unit relaxes said switching conditions by changing said threshold to a value smaller than that at the start of said shift operation.

6. The hybrid driving apparatus according to claim 5, wherein
   said threshold includes a first threshold for switching the selection from said first torque request value to said second torque request value, and a second threshold for switching the selection from said second torque request value to said first torque request value, and said condition relaxing unit relaxes said switching conditions by changing said first and second thresholds to values smaller than those at the start of said shift operation, respectively.

7. The hybrid driving apparatus according to claim 1, wherein
said first producing unit increases said first torque request value such that a section of an increasing rate smaller than that in the other section may be present, when the torque of said second power source is increased according to the drive operation.

8. The hybrid driving apparatus according to claim 1, wherein
said first power source is formed of an engine, and
said second power source is formed of an electrical rotating machine.

9. A vehicle comprising a hybrid driving apparatus, wherein
said hybrid driving apparatus includes:
a rotation output shaft for receiving a whole or a part of output from a first power source;
a transmission mechanism for selectively providing a plurality of gear ratios by a combination of engaging and releasing of a plurality of frictional engagement devices;
a second power source connected to said rotation output shaft via said transmission mechanism;
a first producing unit for producing a first torque request value for said second power source according to a drive operation;
a second producing unit for producing a second torque request value for said second power source according to changes in rotational speed caused by a shift operation;
a switching unit for selecting one of said first and second torque request values according to switching conditions based on said first torque request value during a period of a shift operation from a first gear ratio to a second gear ratio larger than said first gear ratio;
a control unit for controlling said second power source according to the torque request value selected by said switching unit; and
a condition relaxing unit relaxing said switching conditions to ease selection of said first torque request value in accordance with progress of said shift operation.

* * * * *